United States Patent Office 3,420,451
Patented Jan. 7, 1969

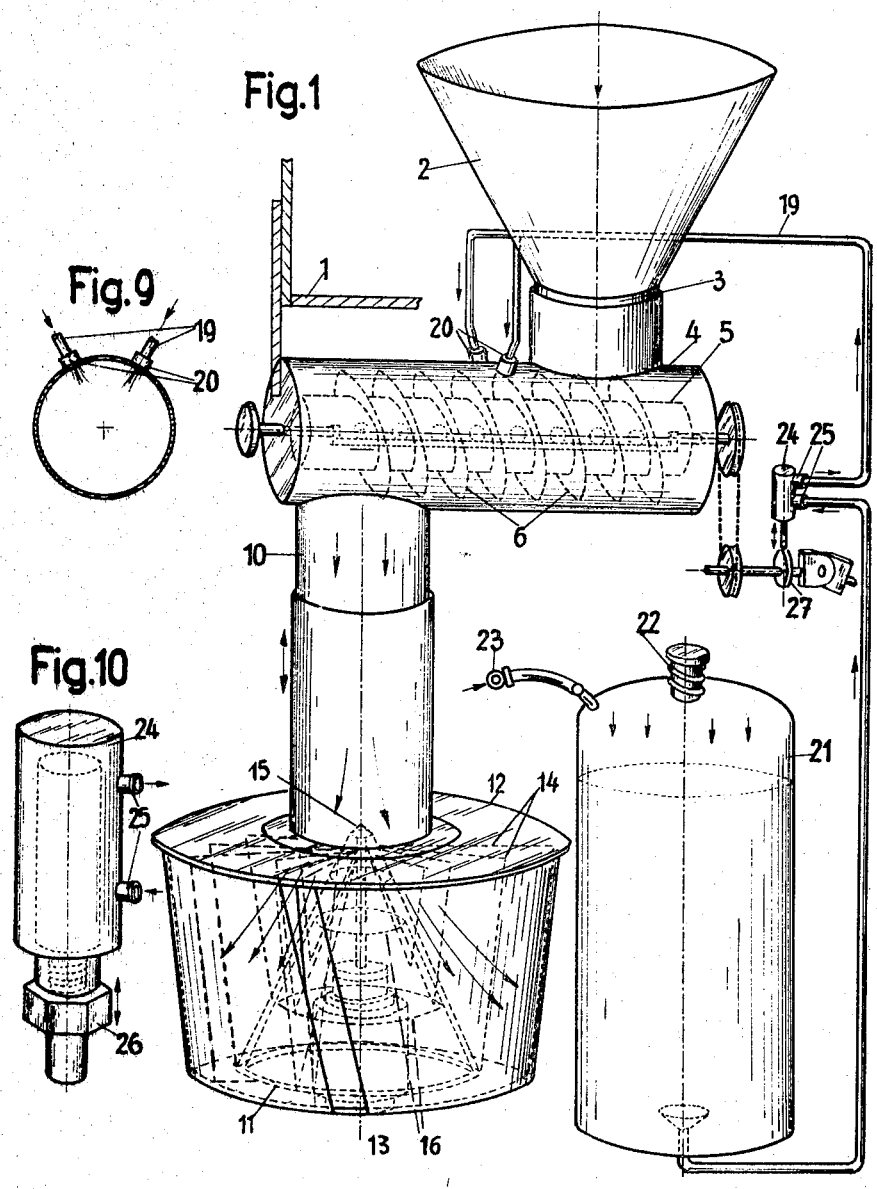

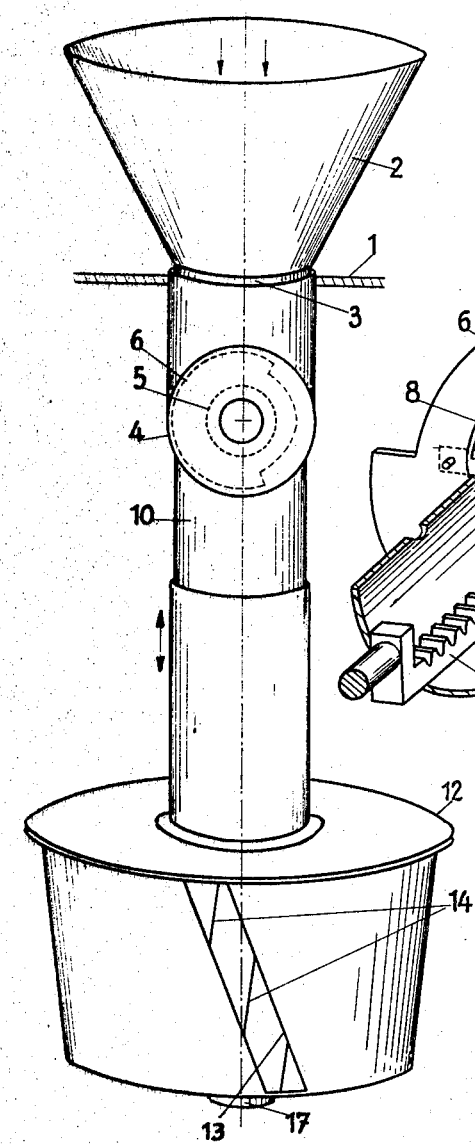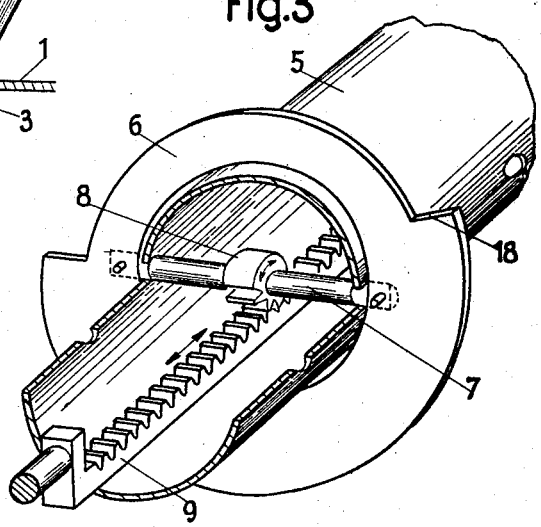

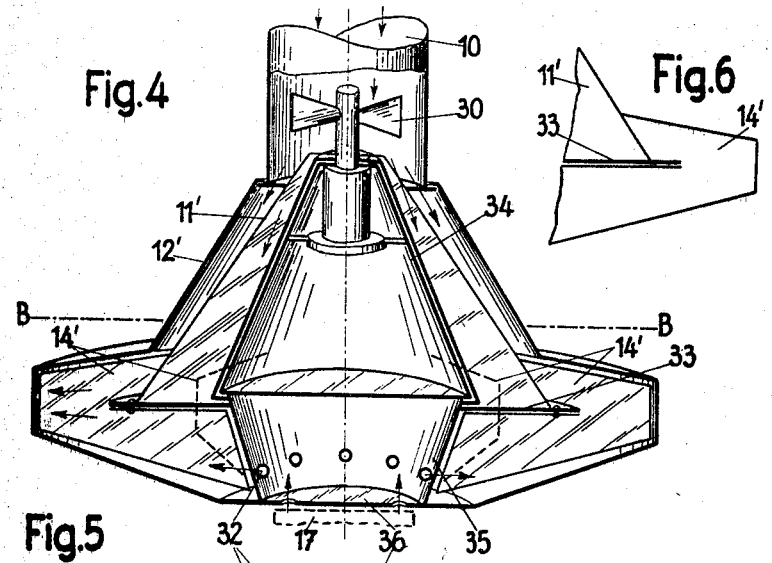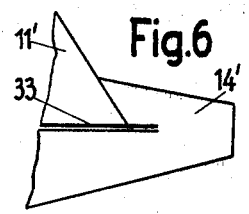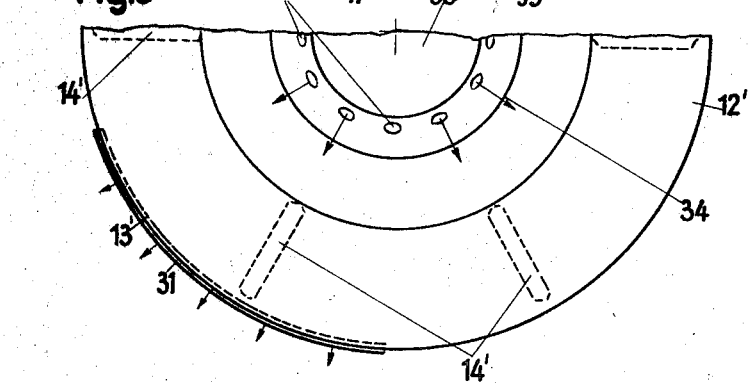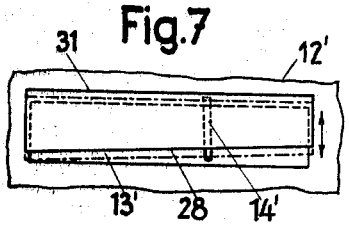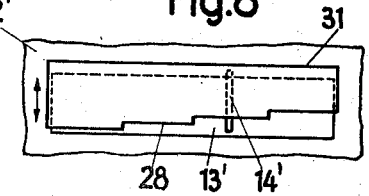

3,420,451
DEVICE FOR SPREADING MOIST MATERIAL ON THE GROUND
Anton Kahlbacher, 8 Aschbachstrasse, Kitzbuhel, Austria
Filed Aug. 18, 1965, Ser. No. 480,671
Claims priority, application Austria, Aug. 25, 1964, A 7,338/64; Apr. 12, 1965, A 3,326/65; July 19, 1965, A 6,595/65
U.S. Cl. 239—666        15 Claims
Int. Cl. E01c *19/20;* A01c *7/16*

ABSTRACT OF THE DISCLOSURE

A device for spraying roadways with moist material, preferably salt, in which the material is fed to a discharge pipe in the quantity desired via a casing with several angularly adjustable disks mounted thereon. A throwing rotor receives the material from the discharge pipe and regularly distributes the material onto the road surface in an adjustable amount and in a desired throwing direction.

---

The invention relates to a device for spreading material on roadways comprising a spreading-material container from which the spreading material is fed into a discharge applicance. The device according to the invention is particularly suitable for spreading common salt or chemical products to make snow covered and icy roads traffic-safe.

Salt-throwers are already known involving the blowing-out of the spreading material through a blowing device or the ejection through spreading applicances, but all known equipments are restricted to the use of dry salt.

In the present invention, however, the possibility of also using wet salt for spreading has been taken into account.

By spreading wet salt a better adhesion to the spread surface is achieved so that the disadvantage of the salt being blown away is eliminated.

The device according to the invention meets all further requirements such as dosage of the amount of spreading material, adjustable spreading width or throwing range in a most simple manner. The invention is characterized in that underneath the filling hole several jointly rotating conveyor surfaces which are adjustable in respect of their inclination to the conveying direction are provided to constitute a quantity-adjustable horizontal conveyance; said conveyor surfaces convey the spreading material towards a vertical pipe having a throwing rotor which is surrounded by a casing having a discharge aperture.

The special advantage of this construction resides in the combination of the horizontal conveyance with the dosage of the spreading material to be ejected, and in the direction-adjustable discharge appliance.

The conveyor surfaces adapted as quantity-adjustable horizontal conveyance may preferably be constructed as disks disposed around a rotating pipe, said disks being swingable in respect of the pipe axis and having recesses shaped as sectors of a circular ring. A screw conveyor with adjustable pitch may also be provided, the adjustment of the pitch being achieved by stretching a screw conveyor made of an elastic material.

The rotation drive of the conveyor surfaces should preferably depend on the vehicle speed, so that the spray density may be adjusted in compliance with the usual requirements, i.e., about 10 to 50 g./m.$^2$.

The width and direction of throw as well as the throwing range are determined by the construction of the throwing rotor according to the invention.

The invention contemplates two different basic types of construction for the throwing device. The first construction relates to a throwing rotor having the shape of a truncated cone tapering downwards and having radially projecting throwing blades. It will be suitable in such case to provide, inside the throwing rotor, a cone tapering upwards, distributor fins being disposed at its surface.

According to another construction, the throwing rotor revolving inside the casing may be constituted by a truncated cone tapering in direction of the supply pipe and provided at its bottom side with a flat plate bearing radially projecting throwing blades which eject the spreading material through the discharge aperture. It will be advantageous to have the device constructed in such manner that the rotor revolves around a fixed, truncated double cone which is hollow and the bases of the two cone parts of which face one another; the surfaces or edges of the rotor, or of the plate and throwing blades respectively, link up closely with the outer jacket of the truncated double cone.

According to a preferred construction, said trancated double cone is so shaped that its lower part has a lesser height and bottom width than the upper trancated part it is connected to. The bottom surface of the truncated double cone below as well as the conical surface of the lower truncated cone have openings through which outside air is introduced into the casing, the air escaping afterwards through the discharge aperture.

The size of the discharge aperture is adjustable by means of a vertical, movable top plate which, variably obturates said aperture and is adjusted to the outer circumference of the flat plate so that the emerging stream of spreading material selectively covers a broader or narrower area. The top plate preferably has a lower boundary line that is inclined or staggered in respect of the horizontal, this resulting in a wider or narrower opening of the slot of the discharge aperture, hence in a broader or narrower spray area, the density of spray becoming altered accordingly.

Since moist material is given preference, particularly for spreading dry roads with salt, the moistening of the spreading material is easily achieved by providing at least one liquid-outlet opening connected to a supply duct within the range of the conveyor surfaces for horizontal conveyance.

The spreading salt is soaked by adding to it a dosed amount of liquid, a uniform intimate mixture being obtained owing to the rotary conveyor action.

The liquid may be water or a diluted salt solution.

Due to the soaking provided by the invention during the horizontal conveyance, a thoroughly moistened salt enters the discharge appliance.

An adequate dosage of the amount of liquid to be added is essentially required. Therefore, it is suggested that a liquid-measuring device operating in accordance with the vehicle speed be inserted into the supply duct.

By said dosage device, liquid is supplied to the spray nozzles at a rate determined by the traveling speed of the vehicle. This is important since the conveyance of the spreading material is also dependent on the vehicle speed.

The supply duct is fed from a container for liquids which may be subjected to pressurized air of the vehicle.

Further characteristics of the invention are described with reference to embodiments illustrated in the accompanying drawings.

FIG. 1 is a perspective view diagrammatically showing the spreading device according to the invention.

FIG. 2 is a back view of the same spreading device, the moistening appliance having been omitted for the sake of clarity;

FIG. 3 shows in perspective and partly in section a detail of the horizontal-conveyance device;

FIG. 4 is a vertical section of an embodiment of the second basic form of the discharge appliance;

FIG. 5 is a horizontal section through part of the appliance represented in FIG. 4 along the line B—B;

FIG. 6 shows in detail the connection between a throwing blade and the bottom plate according to FIG. 4;

FIG. 7 shows a first embodiment of the attachment of a top plate in front of the discharge aperture of the rotor casing according to FIG. 4;

FIG. 8 shows a second embodiment of the top plate attached in front of the discharge aperture;

FIG. 9 is a cross-sectional view of the horizontal-conveyance device and a detail of the moistening appliance;

FIG. 10 is a side view of the liquid-measuring device.

In the drawing there is seen a container 2 for receiving spreading material mounted on the loading platform 1 of a truck. The spreading material is fed into a filling hole 3 from where it passes to a horizontal-conveyance device 4 comprising a shaft 5 driven in dependence of the vehicle speed, conveyor disks 6 being disposed around said pipe.

As can be seen from FIG. 3, said disks 6 are fixed to pins 7 which traverse said pipe 5. The pins 7 engage a toothed rack 9 via a toothed segment 8. By longitudinally shifting the toothed rack 9, the pins 7 are rotated, thus modifying the inclination of the disks 6. The toothed rack 9 can be shifted by means of a handwheel. The swinging range of the disks 6 may reach an inclination of for example up to about 20 degrees.

According to the angle of inclination of the conveyor surfaces, the amount of spreading material transported per revolution will be increased or reduced. Since the rate of speed of rotation of the conveyor device is dependent for instance from the differential, a change in the vehicle speed involves a corresponding change in the rate of speed and consequently in the conveyed quantity.

The disks 6 have recesses 18 shaped as sectors of a circular ring and corresponding to a sector angle of about 130° to 140° to permit transport or conveyance respectively of the spreading material from one disk 6 to another. The recesses 18 of consecutive disks are staggered, while the recesses of every second disk are parallel to each other.

By means of the conveyor surfaces 6 the spreading material is conveyed into the pipe 10 and falls into the throwing rotor 11. With this type of transport of the spreading material congestions are eliminated, a feature of special importance if wet salt is employed.

The discharge device illustrated in FIG. 1 comprises the throwing rotor 11 which is surrounded by a fixed casing 12, said casing having a discharge aperture 13 preferably in inclined position. Said casing 12 can be turned, thus enabling the position of the discharge aperture 13, and with it the direction of throw, to be altered.

The throwing rotor 11 comprises radial throwing blades 14 which seize and eject the spreading material.

In order to ensure a uniform distribution of the spreading material falling through the pipe 10, an upward tapering cone 15 is mounted concentrically inside the throwing rotor 11; radially disposed distributor fins 16 are provided at the cone surface. Said distributor fins 16 have different angular positions in respect of the cone 15 and ensure a uniform distribution of the spreading material as it falls onto them.

Instead of the discharge device shown in FIG. 1, another type of device may be used in which the throwing rotor 11 is constructed according to the second basic form proposed by the invention and illustrated in FIGS. 4–8.

Here the spreading material falling down from the supply pipe 10 reaches the truncated cone of the throwing rotor 11' and glides down along its surface where it is seized by the throwing blades 14' and ejected through the discharge aperture 13'. At the lower end of the truncated cone of the throwing rotor, a flat plate 33 protrudes outwardly from the surfaces of the truncated cone, the throwing blades 14' being attached to said flat plate. In this embodiment, the blades overlap the plate and rest with their upper part against the surface of the truncated cone. The working surface of the throwing blades may be flat or curved; in the latter case, a concave curvature open in the direction of motion would appear to be advantageous.

The casing surrounding the throwing rotor 11' will be so constructed as to be closely adjacent to the truncated cone as well as to the radially projecting throwing blades of the rotor 11', the number of throwing blades being selected according to requirements.

A stationary truncated double cone 34, 35 is provided in the middle of the casing axis, both base surfaces of the cones resting against one another. The upper part 34 of the truncated double cone has a broader base surface than the lower part 35 resting against it, so that the former slightly protrudes over the lower truncated cone 35. Moreover, the upper part 34 has a much greater height than the lower part, the bottom surface 36 being, however, broader than its upper end.

The bottom surface 36 and the surface of the lower part 35 have openings 32 through which air is sucked in when rotor 11' turns and is introduced into the casing 12; the air escapes through the discharge aperture together with the spreading material; due to the supply of air from below and to the suction effected from above, a higher throwing speed of the spreading material is attained.

An adjustable vertical top plate 31 adapted to the outer circumference of the flat plate 33 and obturating the width of the discharge aperture to a greater or lesser extent permits controlling the size of said discharge aperture 13' facing the front edge of the throwing blades 14' and occupying a partial sector of the casing 12', with the result that the emerging stream of spreading material selectively covers a broader or narrower area. According to FIG. 7 the top plate 31 has a lower boundary line 28 inclined with the horizontal, so that the displacement of the top plate 31 in either direction of the double arrow in FIG. 7 effects a broadening or narrowing of the aperture 13'. Such a displacement is indicated by a dash-and-dot line in FIG. 7. In such displacement, the edge 28 of the top plate 31 overlaps the lower edge of the discharge aperture 13' and reduces also the width of the discharge aperture.

An adjustment of the width of opening of the discharge aperture 13' naturally involves a change in the spray density.

FIG. 8 illustrates another possible construction for the lower edge 28 of the top plate 31, namely in a step-like shape. Apart from this, the construction and operation are the same as shown in FIG. 7.

Due to the sloped or stepped shape of the lower edge 28 of the top plate 31, the spreading material uniformly emerges from the aperture 13 thus ensuring an even spray area.

It will be advantageous to provide an agitator 30 on the rotating shaft of the throwing rotor 11', said agitator projecting into the supply pipe 10 its wings distributing the spreading material uniformly over the truncated cone of the throwing rotor. The casing 12' can be turned around the supply pipe so that the direction of throw can be optionally controlled according to circumstances.

In the embodiment of the discharge device as illustrated in FIG. 1 as well as in the embodiment represented in FIGS. 4–8, the throwing rotor 11 or 11' is driven by an electric motor or by a hydraulic motor 17 the throwing range being dependent upon the continuously variable speed of the motor 17 so that it is possible to obtain the desired throwing range by adjusting the rate of rotational speed accordingly.

The discharge devices as disclosed in the foregoing are extremely suitable for applying dry, moist or wet spreading material, warranting in either case a uniform covering of the road surface.

The horizontal-conveyance device 4 is provided with spray nozzles 20 for spraying liquid supplied from a duct 19 in somewhat inclined direction onto the spreading material conveyed horizontally by the conveyor disks 6 (see FIG. 9).

The liquid is retained in a container 21 under constant pressure from the compressed-air unit of the truck through connecting means 23. For filling purposes, a screw connection 22 is provided at the upper side of said container.

A liquid-measuring device 24 is mounted in the supply duct 19 to regulate the flow of liquid in dependence of the vehicle speed.

Said device 24 for dosage of the liquid (FIG. 10) has a hollow piston with two borings, said borings being spaced in accordance with the ducts 25, the cross-section or position of said borings being adjustable by means of a screw 26.

The liquid-measuring device 24 is driven by an eccentric disk 27 connected to the cardan shaft by the driving shaft of the conveyor device. Thus the piston movement is dependent upon the rate of speed of rotation of the cardan shaft.

The liquid passes under the action of compressed air from the container 21 to the dosage device 24, the flow of the liquid being regulated by setting the screw 26 and by the rate of speed of rotation of the cardan shaft. The liquid passes from the dosage device 24 into the spray nozzles 20.

What I claim is:

1. Apparatus for spreading material on the ground, said apparatus comprising a horizontal conveyor device including a conduit having one end with an inlet opening for receiving material to be spread and an opposite end with an outlet for said material, a plurality of conveyor discs, means supporting said discs in said conduit for rotation about a horizontal axis, means for adjusting the angular position of said discs relative to said axis to vary the amount of material fed thereby, a vertical pipe coupled to said conduit at said outlet for receiving the material conveyed through said conduit, a housing mounted at the lower end of said pipe for receiving material therefrom, said housing having a discharge outlet for said material, and rotor means in said housing for discharging the material through said discharge outlet.

2. Apparatus as claimed in claim 1 wherein said discs are circular, each having an angular recess at its periphery, said means supporting said discs comprising a horizontal, rotatable shaft on which the discs are supported for pivotable movement.

3. Apparatus as claimed in claim 2 wherein the recesses of successive discs are staggered and the recesses of every second disc are aligned.

4. Apparatus as claimed in claim 1 wherein said means supporting said discs comprises a hollow shaft, said discs being pivotably mounted on said shaft, a toothed segment coupled to each disc and positioned within the shaft, and a displaceable rack in said shaft engaging the toothed segments of the discs for pivotably moving the same as the rack is displaced.

5. Apparatus as claimed in claim 1 wherein said housing has a truncated conical shape and narrows downwardly, said rotor means including a rotor member with radial blades thereon.

6. Apparatus as claimed in claim 5 comprising a member of conical shape concentrically mounted within said rotor with its apex above its base.

7. Apparatus as claimed in claim 6 comprising radial distribution fins on said member of conical shape.

8. Apparatus as claimed in claim 1 wherein said housing is mounted for angular adjustment on said pipe to adjust the position of the discharge outlet and hence the direction of discharge of the material.

9. Apparatus as claimed in claim 1 comprising means for injecting a liquid into said conduit to wet the material to be spread.

10. Apparatus as claimed in claim 9 wherein said means for injecting a liquid into said conduit comprises a plurality of spray nozzles opening into said conduit.

11. Apparatus as claimed in claim 9 wherein the apparatus is mounted on a vehicle and said means for injecting a liquid into said conduit comprises means for regulating the quantity of fluid fed to said conduit in relation to the vehicle speed.

12. Apparatus as claimed in claim 9 wherein said means for injecting a liquid into said conduit comprises a container for the liquid, and means for the supply of compressed air to the container to pressurize the liquid.

13. Apparatus as claimed in claim 1 comprising means on said housing for adjusting the size of said discharge outlet.

14. Apparatus as claimed in claim 1 comprising a stationary hollow double conical member mounted within said rotor means.

15. Apparatus as claimed in claim 13 wherein said double conical member has a base with air passage holes therein and in the conical surface proximate said base.

References Cited

UNITED STATES PATENTS

| 366,974 | 7/1887 | Murphy | 239—515 |
|---|---|---|---|
| 423,997 | 3/1890 | Henrichsen | 239—687 |
| 803,924 | 11/1905 | McGrath et al. | 198—216 |
| 922,028 | 5/1908 | Parrish | 239—683 |
| 1,320,214 | 10/1919 | Emerson | 198—216 |

FOREIGN PATENTS 4,325 2/1907 Great Britain.

EVERETT W. KIRBY, *Primary Examiner.*

U.S. Cl. X.R.

198—216; 239—675, 677, 687, 689